US011862205B1

(12) United States Patent
Freitag et al.

(10) Patent No.: US 11,862,205 B1
(45) Date of Patent: Jan. 2, 2024

(54) SPIN TORQUE OSCILLATOR WITH MULTILAYER SEED FOR IMPROVED PERFORMANCE AND RELIABILITY

(71) Applicant: Western Digital Technologies, Inc., San Jose, CA (US)

(72) Inventors: James Mac Freitag, Sunnyvale, CA (US); Yongchul Ahn, San Jose, CA (US); Susumu Okamura, San Jose, CA (US); Christian Kaiser, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/845,809

(22) Filed: Jun. 21, 2022

(51) Int. Cl.
*G11B 5/115* (2006.01)

(52) U.S. Cl.
CPC .................................... *G11B 5/115* (2013.01)

(58) Field of Classification Search
None
See application file for complete search history.

(56) References Cited

U.S. PATENT DOCUMENTS

| | | | |
|---|---|---|---|
| 6,404,601 B1* | 6/2002 | Rottmayer | G11B 5/398 360/123.25 |
| 8,274,811 B2 | 9/2012 | Zhang et al. | |
| 8,922,949 B1* | 12/2014 | Koui | G11B 5/235 360/125.3 |
| 9,208,801 B2 | 12/2015 | Zhang et al. | |
| 9,218,828 B1 | 12/2015 | Koui et al. | |
| 9,230,571 B1 | 1/2016 | Chen et al. | |
| 10,410,658 B1* | 9/2019 | Liu | G11B 5/7379 |
| 10,734,013 B2 | 8/2020 | Gao et al. | |
| 10,818,837 B1* | 10/2020 | Otani | H10N 50/10 |
| 10,839,833 B1* | 11/2020 | Freitag | H01F 10/3286 |
| 10,943,611 B1* | 3/2021 | Freitag | G11B 5/235 |

(Continued)

FOREIGN PATENT DOCUMENTS

WO    2017165058 A1    9/2017

OTHER PUBLICATIONS

Zhou, Tiejun et al., "Stability of Spin Torque Oscillators for MAMR: Perspectives of Materials and Design", Jan. 2019, Institute of Electrical and Electronics Engineers, <https://ieeexplore.IEEE.org/document/8601055>.

*Primary Examiner* — William J Klimowicz
(74) *Attorney, Agent, or Firm* — PATTERSON + SHERIDAN, LLP; Steven H. VerSteeg

(57) ABSTRACT

The present disclosure generally relates to a magnetic recording device having a magnetic recording head comprising a spintronic device. The spintronic device is disposed between a main pole and a trailing shield at a media facing surface. The spintronic device comprises a spin torque layer (STL) and a multilayer seed layer disposed in contact with the STL. The spintronic device may further comprise a field generation layer disposed between the trailing shield and the STL. The multilayer seed layer comprises an optional high etch rate layer, a heat dissipation layer comprising Ru disposed in contact with the optional high etch rate layer, and a cooling layer comprising Cr disposed in contact with the heat dissipation layer and the main pole. The high etch rate layer comprises Cu and has a high etch rate to improve the shape of the spintronic device during the manufacturing process.

20 Claims, 6 Drawing Sheets

(56) References Cited

U.S. PATENT DOCUMENTS

| | | | |
|---|---|---|---|
| 10,997,993 B1* | 5/2021 | Freitag | G11B 5/3912 |
| 11,127,420 B1* | 9/2021 | Freitag | G11B 5/314 |
| 11,289,118 B1 | 3/2022 | Kaiser et al. | |
| 2006/0012924 A1* | 1/2006 | Takano | G11B 5/3932 |
| 2008/0151438 A1* | 6/2008 | Tanaka | H01F 10/30 |
| | | | 360/319 |
| 2012/0113540 A1* | 5/2012 | Zhang | G11B 5/3133 |
| | | | 360/59 |
| 2012/0126905 A1* | 5/2012 | Zhang | G11C 11/1675 |
| | | | 427/130 |
| 2014/0160598 A1* | 6/2014 | Takashita | G11B 5/3136 |
| | | | 360/234.3 |
| 2017/0148474 A1* | 5/2017 | Okamura | G11B 5/314 |
| 2019/0259412 A1* | 8/2019 | Gao | H10N 50/80 |
| 2019/0279666 A1* | 9/2019 | Freitag | G11B 5/6082 |
| 2019/0279668 A1* | 9/2019 | Freitag | G11B 5/3133 |
| 2020/0312354 A1 | 10/2020 | Wu et al. | |
| 2021/0125631 A1 | 4/2021 | Bai et al. | |
| 2022/0148619 A1 | 5/2022 | Freitag et al. | |
| 2023/0030248 A1* | 2/2023 | Okamura | H10N 50/80 |

* cited by examiner

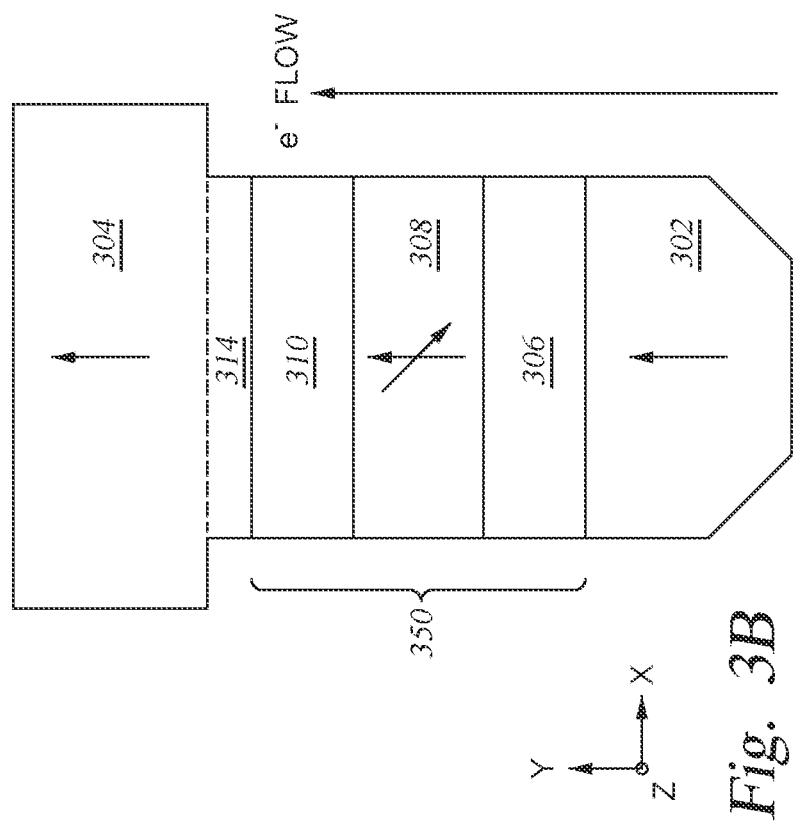
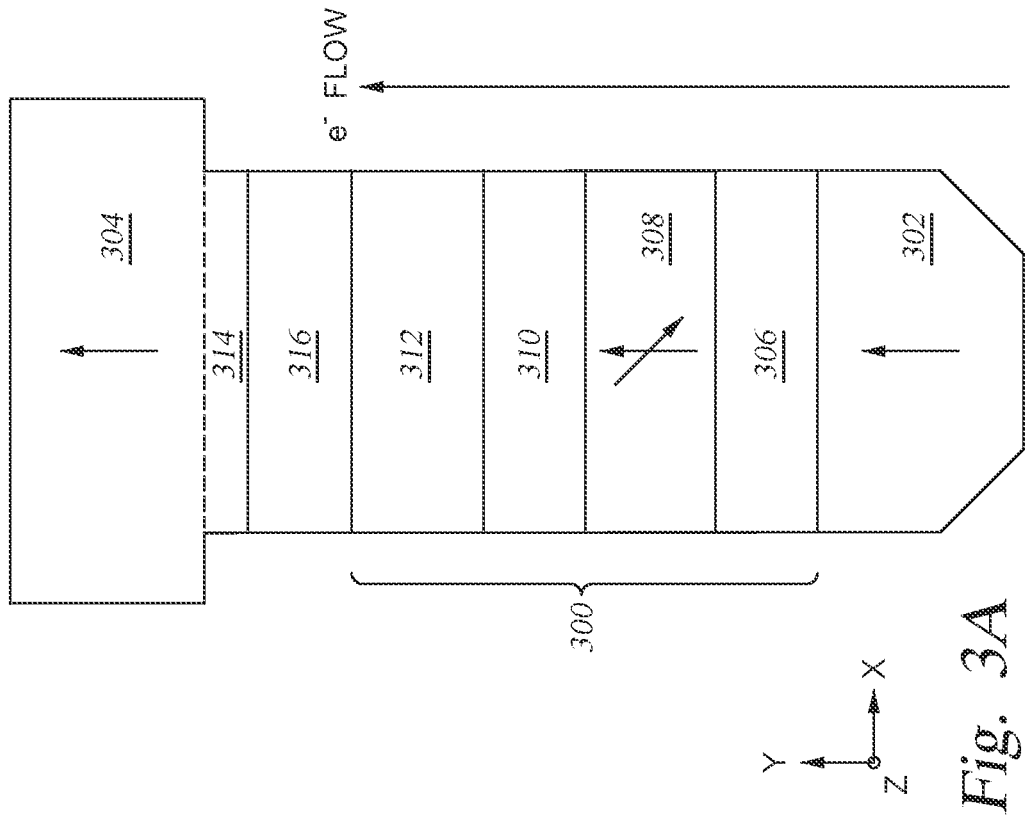

SPIN TORQUE OSCILLATOR WITH MULTILAYER SEED FOR IMPROVED PERFORMANCE AND RELIABILITY

BACKGROUND OF THE DISCLOSURE

Field of the Disclosure

Embodiments of the present disclosure generally relate to a magnetic recording head comprising a spin torque oscillator (STO), such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 $Tbit/in^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface (MFS). As the main pole becomes smaller, the writing field becomes smaller as well, limiting the effectiveness of the magnetic write head.

Heat-assisted magnetic recording (HAMR) and microwave-assisted magnetic recording (MAMR) are two types of energy-assisted recording technology to improve the recording density of a magnetic recording medium, such as a HDD. In MAMR, a spin torque oscillator (STO) device is located next to or near the write element such that in operation the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Energy-assisted recording write heads may require an undesirable high voltage and/or an undesirable high current to produce a write field enhancement. A high voltage and/or high current may impact the lifetime and the reliability of the write head by degrading components of the write head. Lowering the bias voltage or current, or lowering the moment-thickness product of the energy-assist magnetic layer that generates the enhanced write field, can hinder writer performance, lower areal density capability (ADC), and/or limit the materials used in write heads.

Therefore, there is a need for write heads that simply and effectively facilitate write head performance reliability and high moment-thickness product of the energy-assist magnetic layer while facilitating lower voltage or current to facilitate effective and efficient magnetic recording, and high ADC of magnetic recording.

SUMMARY OF THE DISCLOSURE

The present disclosure generally relates to a magnetic recording device having a magnetic recording head comprising a spintronic device. The spintronic device is disposed between a main pole and a trailing shield at a media facing surface. The spintronic device comprises a spin torque layer (STL) and a multilayer seed layer disposed in contact with the STL. The spintronic device may further comprise a field generation layer disposed between the trailing shield and the STL. The multilayer seed layer comprises an optional high etch rate layer, a heat dissipation layer comprising Ru disposed in contact with the optional high etch rate layer, and a cooling layer comprising Cr disposed in contact with the heat dissipation layer and the main pole. The high etch rate layer comprises Cu and has a high etch rate to improve the shape of the spintronic device during the manufacturing process.

In one embodiment, a magnetic recording head comprises a main pole, a trailing shield disposed adjacent to the main pole, and a spintronic device disposed between the main pole and the trailing shield, the spintronic device comprising: a field generation layer disposed adjacent to the trailing shield, a spacer layer disposed in contact with the field generation layer, a spin torque layer disposed in contact with the spacer layer, and a multilayer seed layer disposed in contact with the spin torque layer and the main pole, the multilayer seed layer comprising a heat dissipation layer and a cooling layer disposed in contact with the heat dissipation layer.

In another embodiment, a magnetic recording head comprises a main pole, a trailing shield disposed adjacent to the main pole, and a spintronic device disposed between the main pole and the trailing shield, the spintronic device comprising: a first spacer layer disposed adjacent to the trailing shield, a spin torque layer disposed in contact with the first spacer layer, and a multilayer seed layer disposed in contact with the spin torque layer and the main pole, the multilayer seed layer comprising a high etch rate layer, a heat dissipation layer disposed in contact with the high etch rate layer, and a cooling layer disposed in contact with the heat dissipation layer and the main pole.

In yet another embodiment, a magnetic recording head comprises a main pole, a trailing shield disposed adjacent to the main pole, and a spintronic device disposed between the main pole and the trailing shield, the spintronic device comprising: a spin torque layer, a Cu layer disposed under the spin torque layer, a Ru layer disposed in contact with the Cu layer, and a Cr layer disposed in contact with the Ru layer and the main pole.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3B illustrate media facing surface (MFS) views of spintronic devices disposed between a main pole and a trailing shield, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording device having a magnetic recording head comprising a spintronic device. The spintronic device is disposed between a main pole and a trailing shield at a media facing surface. The spintronic device comprises a spin torque layer (STL) and a multilayer seed layer disposed in contact with the STL. The spintronic device may further comprise a field generation layer disposed between the trailing shield and the STL. The multilayer seed layer comprises an optional high etch rate layer, a heat dissipation layer comprising Ru disposed in contact with the optional high etch rate layer, and a cooling layer comprising Cr disposed in contact with the heat dissipation layer and the main pole. The high etch rate layer comprises Cu and has a high etch rate to improve the shape of the spintronic device during the manufacturing process.

Figure 1:
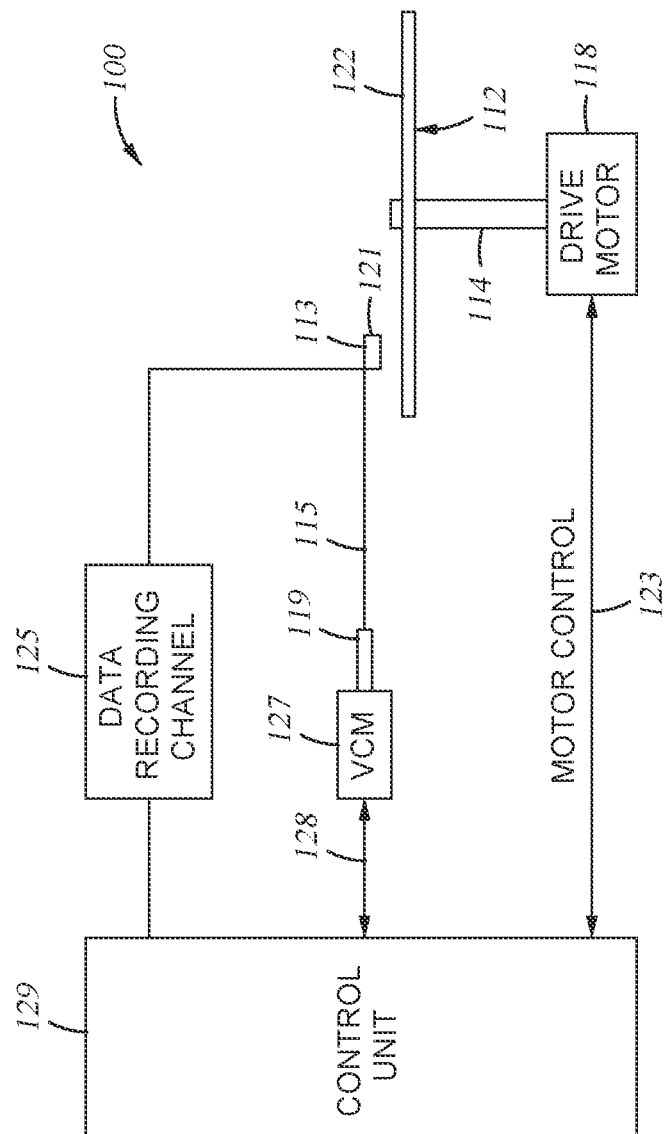
FIG. 1 is a schematic illustration of a magnetic recording device, according to one implementation.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
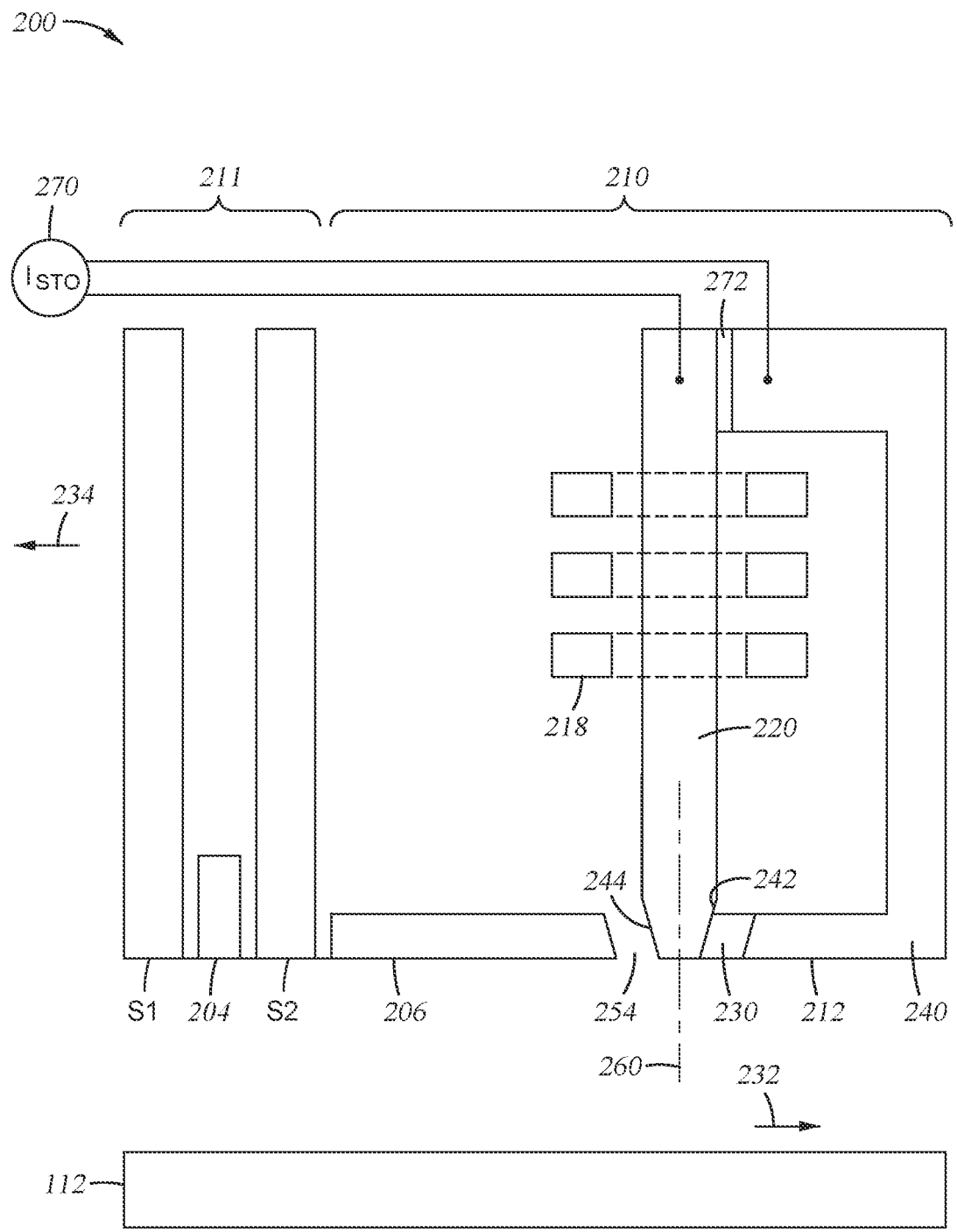
FIG. 2 is a schematic illustration of a cross sectional side view of a head assembly facing the magnetic disk shown in FIG. 1 or other magnetic storage medium, according to one implementation.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

FIGS. 3A-3B illustrate media facing surface (MFS) views of spintronic devices 300, 350, respectively, disposed between a main pole 302 and a trailing shield 304, according to various embodiments. Each of the spintronic devices 300, 350 may independently be a STO, and as such, may be referred to herein as STO 300 and STO 350. Both the STO 300 and the STO 350 may independently be utilized in the magnetic recording device 100, such as in the head assembly 121. Both the STO 300 and the STO 350 may independently be the spintronic device 230 of FIG. 2, the main pole 302 may be the main pole 220 of FIG. 2, and the trailing shield 304 may be the TS 240 of FIG. 2.

In FIG. 3A, the STO 300 comprises a seed layer 306 disposed on the main pole 302, a spin torque layer (STL) 308 disposed on the seed layer 306, a spacer layer 310 disposed on the STL 308, a field generation layer (FGL) 312 disposed on the spacer layer 310, and a second spacer layer or spin-blocking cap layer 316 disposed on the FGL 312. As shown in FIG. 3A, the trailing shield 304 may optionally comprise a notch 314 disposed in contact with the FGL 312.

The spintronic device 350 of FIG. 3B is the same as the spintronic device 300 of FIG. 3A; however the spintronic device 350 does not comprise a FGL. Rather, the spacer layer 310 is disposed in contact with the trailing shield 304 or the notch 314 of the trailing shield 304 instead.

The seed layer 306 may comprise a multilayer structure, as discussed below in FIGS. 4A-4C. The STL 308 may comprise single layers or multilayer combinations of Ni, Fe, Co, binary or ternary alloys of Ni, Fe, Co, and half-metallic Heusler alloys, for instance $Co_2MnGe$ having a thickness in the y-direction of about 2 nm to about 12 nm. The spacer layers 310 and 316 may each individually comprise a long spin-diffusion length material such as Cu, Ag, or Cu and Ag alloys, or combinations thereof having a thickness in the y-direction of about 2 nm to about 8 nm. In some embodiments, the second spacer layer 316 may comprise Cr. The FGL 312 may comprise single layers or multilayer combinations of Ni, Fe, Co, binary or ternary alloys of Ni, Fe, Co, and half-metallic Heusler alloys, for instance $Co_2MnGe$ having a thickness in the y-direction of about 5 nm to about 15 nm. When an electric current is applied, the electrons may flow from the main pole 302 through the STO 300, or the STO 350, to the trailing shield 304 in the y-direction, as shown by the arrow labeled e-flow.

Figure 4B:
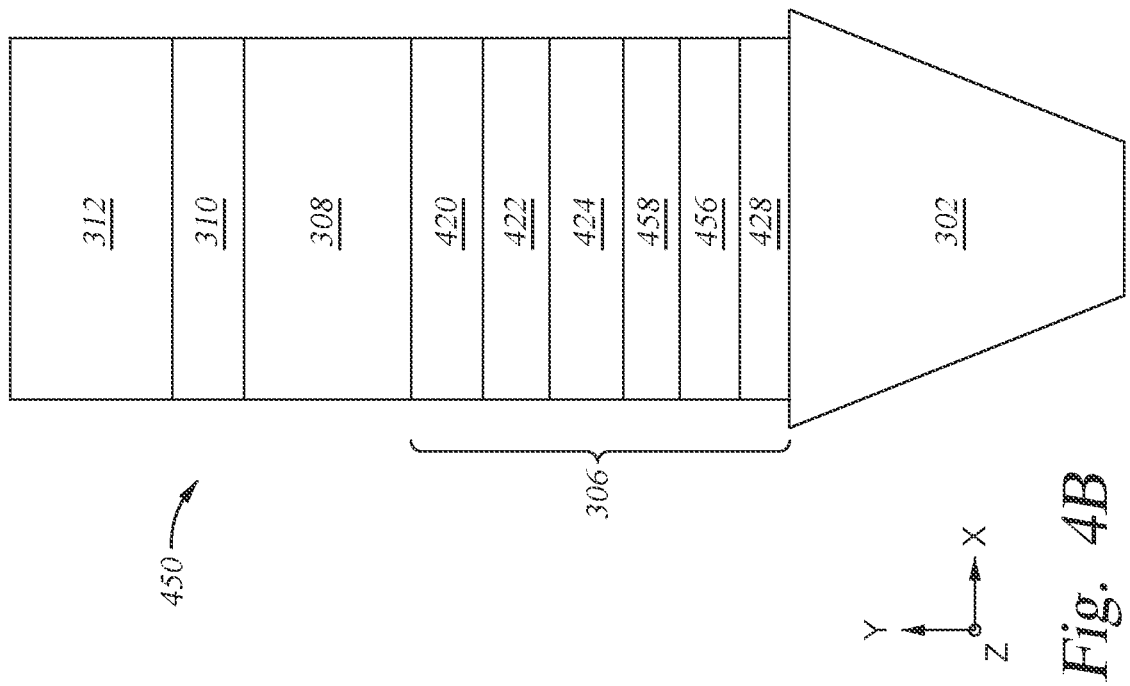
FIGS. 4A-4B illustrate MFS views of spintronic devices or STOs, according to various embodiments.
Figure 4A:
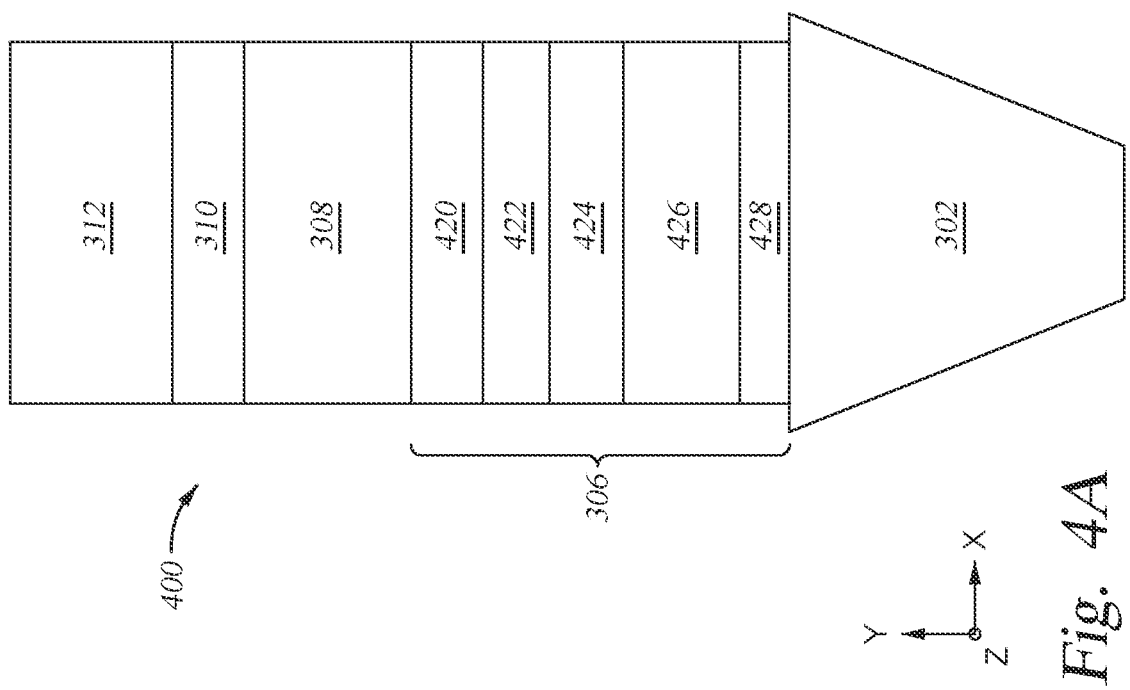

FIGS. 4A-4B illustrate MFS views of spintronic devices or STOs 400, 450, respectively, according to various embodiments. Each STO 400, 450 may be, or be utilized with, the STO 300 of FIG. 3A or the STO 350 of FIG. 3B. Each STO 400, 450 may independently be utilized in the magnetic recording device 100, such as in the head assembly 121. Each STO 400, 450 may independently be the spintronic device 230 of FIG. 2. As noted above with respect to FIG. 3A, the spintronic devices 400, 450 may not include the FGL 312 in some embodiments. As such, the FGL 312 of FIGS. 4A-4B may be optional.

In each STO 400, 450, the seed layer 306, the STL 308, and the spacer layer 310 may be the STL 308 and spaced layer 310 of FIGS. 3A-3B. The FGL 312 in each STO 400, 450 may be the FGL 312 of FIG. 3A. While each STO 400, 450 is shown comprising the FGL 312, the STOs 400, 450 may not comprise the FGL, like shown in FIG. 3B.

Figure 5B:
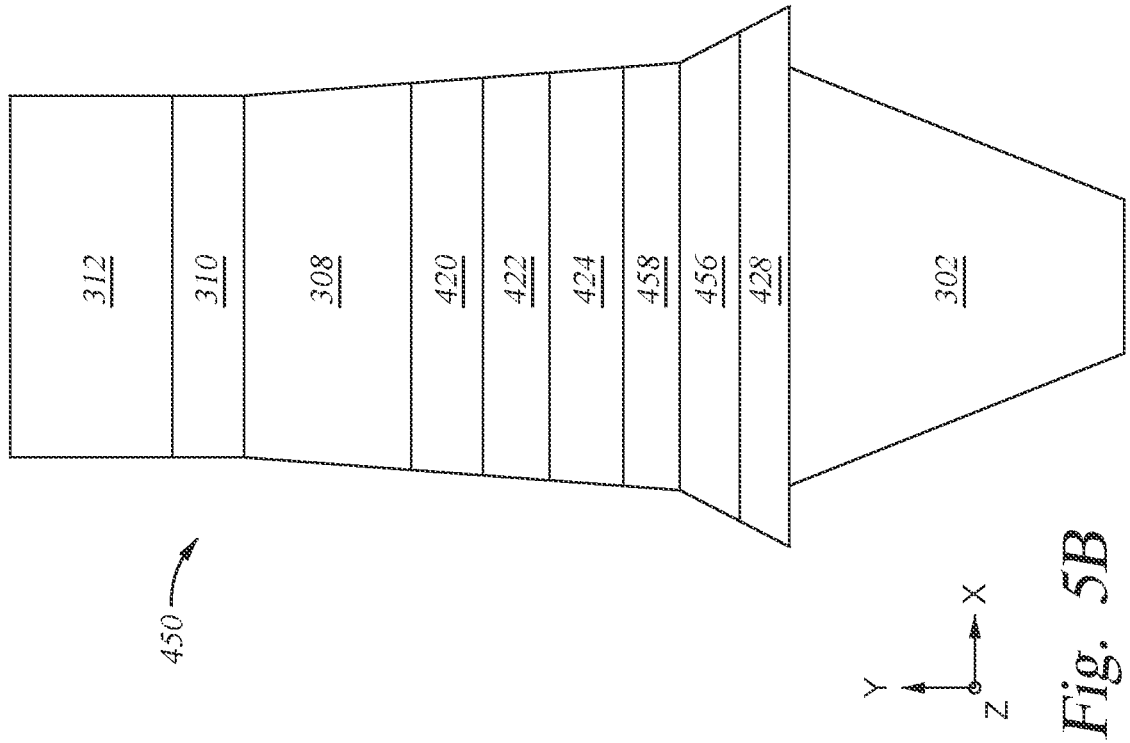
FIGS. 5A-5B illustrate MFS views of the spintronic devices of FIGS. 4A and 4B, respectively, after being deposited and etched, according to various embodiments.
Figure 5A:
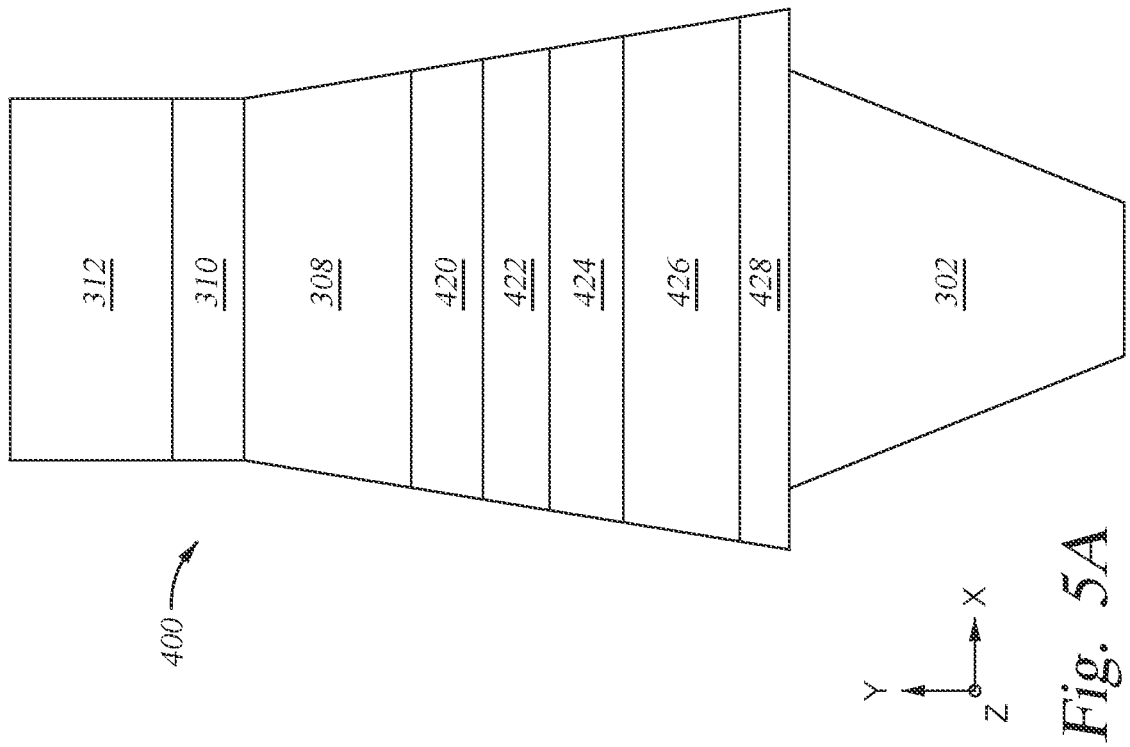

In the STO 400 of FIG. 4A, the seed layer 306 is a multilayer structure comprising a first layer 420 disposed in contact with the STL 308, a second layer 422 disposed in contact with the first layer 420, a third layer 424 disposed in contact with the second layer 422, a fourth layer 426 disposed in contact with the third layer 424, and a fifth layer 428 disposed in contact with the fourth layer 426 and a main pole (shown in FIG. 5A).

The first layer 420 may be referred to as a first texture layer 420 or an anti-damping layer 420, as the first layer 420 lowers damping in the STO 400. The first layer 420 comprises NiAl, or a tantalum alloy containing an atomic percent content of tantalum in a range from 20% to 50%, such as in a range from 25% to 35%, and has a thickness in the y-direction (i.e., at the MFS) of about 2.5 nm to about 3.5 nm, such as about 3 nm. The second layer 422 may be referred to as a second texture layer 422. The second layer 422 comprises Ru or a Ru alloy and has a thickness in the y-direction of about 2 nm to about 2.5 nm, such as about 2.3 nm. The third layer 424 may be referred to as an amorphous layer 424. The third layer 424 comprises NiFeTa and has a thickness in the y-direction of about 2.5 nm to about 3 nm, such as about 2.7 nm.

The first, second, and third layer 420, 422, 424 may be referred to as the functional seed layers of the STO 400. In various embodiments, the functional seed layer ensure a good texture break with complete spin mixing between the main pole material and the STO, set up the preferred texture for growth of the STO, and reduce ferromagnetic damping of the STO to reduce the critical current Jc for STO reversal. Whereas a minimum seed layer thickness is required to provide its necessary functions, it is often advantageous to increase the thickness of the seed layer by adding non-functional layers under the functional ones. For instance, a thick seed layer can be shaped during STO device fabrication into a long tail that helps distribute the heat generated from device operation and improve the reliability of the STO. An example material for the tail under the functional layers of the seed is Ru. However, adding a tail under the STO can impact the shape of the STL in the STO and negatively impact the requirement of critical current Jc. To recover the lost performance, sufficient overmilling into the tail may be required, which limits the effectiveness of the tail at distributing the excess heat. Various embodiments described herein provide a tail with an improved multilayer structure that addresses the above issues.

As shown, the tail includes the fourth layer 426 and the fifth layer 428. The fourth layer 426 may be referred to as a heat dissipation layer 426. The fourth layer 426 comprises, for instance, Cr, Ta, Ru, or combinations thereof, and has a thickness in the y-direction of about 6 nm to about 12 nm, such as about 6.5 nm. The fifth layer 428 may be referred to as a cooling layer 428. The fifth layer 428 comprises a positive Seebeck coefficient material such as Cr, or alloys of Fe—Cr, Ni—Cr and Fe—W and has a thickness in the y-direction of about 1.5 nm to about 2.5 nm, such as about 2 nm. In combination, the heat dissipation layer 426 and the cooling layer 428 address the heat dissipation issue noted above.

In the STO 450 of FIG. 4B, the seed layer 306 is a multilayer structure comprising the first layer 420 disposed in contact with the STL 308, the second layer 422 disposed in contact with the first layer 420, the third layer 424 disposed in contact with the second layer 422, a high etch rate (HER) layer 458 disposed in contact with the third layer 424, a fourth layer 456 disposed in contact with the HER layer 458, and the fifth layer 428 disposed in contact with the fourth layer 456 and a main pole (shown in FIG. 5B). The HER layer 458 may be referred to as a sixth layer 458. The HER layer 458 has a high etch rate relative to the third layer 424 below it, such as about twice the etch rate of the third layer 424.

The first layer 420 or the first texture layer 420 or an anti-damping layer 420 comprises NiAl, or a tantalum alloy containing an atomic percent content of tantalum in a range from 20% to 50%, such as in a range from 25% to 35%, and has a thickness in the y-direction (i.e., at the MFS) of about 2.5 nm to about 3.5 nm, such as about 3 nm. The second layer 422 or second texture layer 422 comprises Ru or a Ru alloy and has a thickness in the y-direction of about 2 nm to about 2.5 nm, such as about 2.3 nm. The third layer or amorphous layer 424 comprises NiFeTa and has a thickness in the y-direction of about 2.5 nm to about 3 nm, such as about 2.7 nm.

As noted above, adding a tail under the STO can impact the shape of the STL in the STO and can negatively impact the requirement of the critical current Jc. Here, the HER layer 458, or the sixth layer, has a high etch rate to improve the shape of the STO 450 (e.g., the STL and the functional seed layers) during the manufacturing process, allowing for reduction of the critical current Jc, as will be further shown in FIG. 6. The HER layer 458 comprises a material with high sputter etch rate such as Cu and has a thickness in the y-direction of about 1.5 nm to about 2.5 nm, such as about 2 nm. The fourth layer 456, or heat dissipation layer 456, is similar to the fourth layer 426 of FIG. 4A. The fourth layer 456 comprises, for instance, Cr, Ta, Ru, or combinations thereof, but has a thickness in the y-direction of about 4 nm to about 5 nm, such as about 4.5 nm. The fifth layer 428, or cooling layer 428, comprises a positive Seebeck coefficient material such as Cr, or alloys of Fe—Cr, Ni—Cr and Fe—W and has a thickness in the y-direction of about 1.5 nm to about 2.5 nm, such as about 2 nm. The HER layer 458, the fourth layer 456, and the fifth layer 428 may be referred to as a tail of the STO 450 while the first, second, and third layer 420, 422, 424 may be referred to as the functional seed layers of the STO 450.

FIGS. 5A-5B illustrate MFS views of spintronic devices or STOs 400, 450, of FIGS. 4A and 4B, respectively, after being deposited and etched, according to various embodiments. The STO 400 of FIG. 5A corresponds to the STO 400 of FIG. 4A, and the STO 450 of FIG. 5B corresponds to the STO 450 of FIG. 4B. FIGS. 5A-5B illustrate the spintronic devices or STOs 400, 450 after fabrication, whereas FIGS. 4A-4B illustrate conceptual views of the spintronic devices or STOs 400, 450. As noted above with respect to FIG. 3A, the spintronic devices 400, 450 may not include the FGL 312 in some embodiments. As such, the FGL 312 of FIGS. 5A-5B may be optional.

As noted above, the STO 450 of FIGS. 4B and 5B comprises the HER layer 458, or the sixth layer, which has a high etch rate to improve the shape of the STO 450 during the manufacturing process. As shown by FIGS. 5A-5B, the STO 450 of FIG. 5B has a more well-defined shape than the STO 400 of FIG. 5A. For example, the STL 308, the first layer 420, the second layer 422, the third layer 424, and the HER layer 458 of the STO 450 each has a substantially equal width in the x-direction. The fourth layer 456 in the STO 450 has a greater width in the x-direction than the other layers 312, 310, 308, 420, 422, 424, 458 of the STO 450, and the fifth layer 428 of the STO has a greater width in the x-direction than the fourth layer 456 and the main pole 302.

Comparatively, in the STO 400 of FIG. 5A, the STL 308 has a greater width in the x-direction than the FGL 312 and the spacer layer 310, the first layer 420 has a greater width in the x-direction than the STL 308, the second layer 422 has a greater width in the x-direction than first layer 420, the third layer 424 has a greater width in the x-direction than second layer 422, the fourth layer 426 has a greater width in the x-direction than the third layer 424, and the fifth layer 428 has a greater width in the x-direction than the fourth layer 426. As such, the STO 400 an STL 308 with a has more of a pyramid-like shape with sloped sides, and the STO 450 has a more overall rectangular shape with substantially straight sides in the y-direction from the STL 308 to the HER layer 458.

Figure 6:
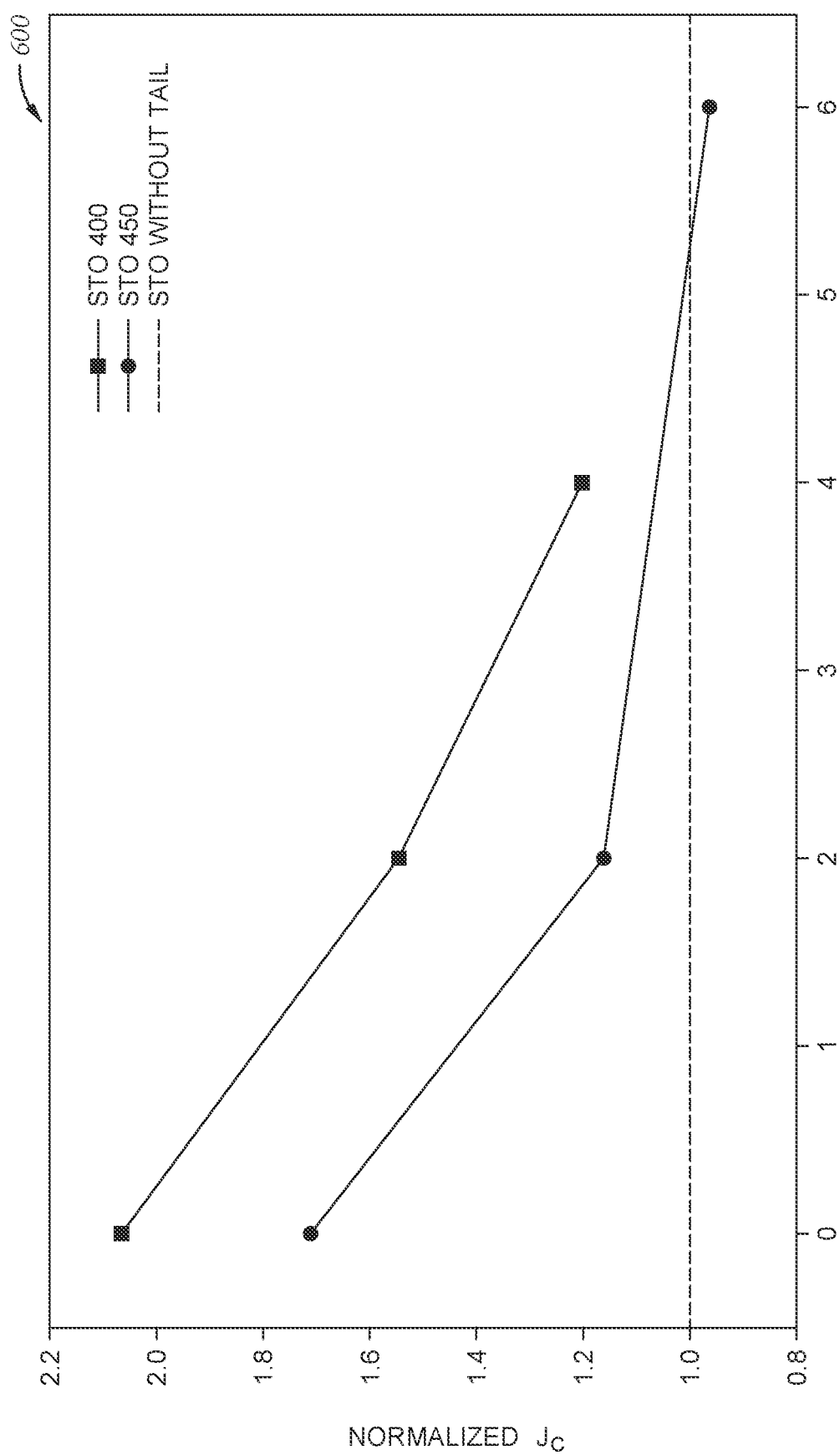
FIG. 6 illustrates a graph of normalized critical current (Jc) versus over milling depth in nm for the spintronic device of FIGS. 4A and 5A, the spintronic device of FIGS. 4B and 5B, and an spintronic device comprising only functional seed layers without a tail, according to one embodiment.

The more-defined shape of the STO 450 improves the reliability and performance while reducing the critical current (Jc) through the STO 450, as shown in FIG. 6. While the STO 400 has an improved reliability and performance compared to conventional STOs, the STO 400 has a higher critical current than the STO 450. Thus, by including the HER layer 458 in the STO 450 to improve the shape of the STO 450 during the manufacturing process, increased reliability and performance is achieved while the critical current is reduced.

FIG. 6 illustrates a graph 600 of normalized critical current (Jc) versus over milling depth in nm for the STO 400 of FIGS. 4A and 5A, the STO 450 of FIGS. 4B and 5B, and an STO comprising only functional seed layers without a tail, according to one embodiment. The over milling of the STOs defines depth and/or shape of the taper of the overall structure, as discussed above in FIGS. 5A-5B. The STO comprising only functional seed layers may comprise only the FGL 312, the spacer layer 310, the STL 308, the first layer 420, the second layer 422, and the third layer 424, where the third layer 424 is disposed in contact with a main pole.

As shown in FIG. 6, the STO 400 has a greater normalized critical current than the STO 450, even when the STO 450 is over milled about 6 nm. Additionally, even when the STO 450 is over milled about 6 nm, the STO 450 has a lower normalized critical current than the STO comprising only functional seed layers. Thus, by including the HER layer 458 in the STO 450, the normalized critical current is reduced compared to the STO 400 and the STO comprising only functional seed layers.

Therefore, by including a multilayer seed layer within a spintronic device, the multilayer seed layer comprising a high etch rate layer, a heat dissipation layer, and a cooling layer, the overall shape of the etched spintronic device is improved. The improved shape of the spintronic device results in the spintronic device having increased reliability and performance while reducing the critical current.

In one embodiment, a magnetic recording head comprises a main pole, a trailing shield disposed adjacent to the main pole, and a spintronic device disposed between the main pole and the trailing shield, the spintronic device comprising: a field generation layer disposed adjacent to the trailing shield, a spacer layer disposed in contact with the field generation layer, a spin torque layer disposed in contact with the spacer layer, and a multilayer seed layer disposed in contact with the spin torque layer and the main pole, the multilayer seed layer comprising a heat dissipation layer and a cooling layer disposed in contact with the heat dissipation layer.

The heat dissipation layer comprises Ru and the cooling layer comprises Cr. The heat dissipation layer has a thickness of about 6 nm to about 12 nm, and the cooling layer has a thickness of about 1.5 nm to about 2.5 nm. The spintronic device further comprises an anti-damping layer disposed in contact with the spin torque layer, a texture layer disposed in contact with the anti-damping layer, and an amorphous layer disposed in contact with the texture layer and the heat dissipation layer. The cooling layer is disposed in contact with the main pole. The anti-damping layer comprises NiAl having a thickness of about 2 nm to about 4 nm, the texture layer comprises Ru having a thickness of about 2 nm to about 2.5 nm, and the amorphous layer comprises NiFeTa having a thickness of about 2.5 nm to about 3 nm. The spintronic device further comprises a field generation layer disposed between the trailing shield and the spacer layer. A magnetic recording device comprises the magnetic recording head.

In another embodiment, a magnetic recording head comprises a main pole, a trailing shield disposed adjacent to the main pole, and a spintronic device disposed between the main pole and the trailing shield, the spintronic device comprising: a first spacer layer disposed adjacent to the trailing shield, a spin torque layer disposed in contact with the first spacer layer, and a multilayer seed layer disposed in contact with the spin torque layer and the main pole, the multilayer seed layer comprising a high etch rate layer, a heat dissipation layer disposed in contact with the high etch rate layer, and a cooling layer disposed in contact with the heat dissipation layer and the main pole.

The high etch rate layer comprises Cu having a thickness of about 1 nm to about 3 nm, the heat dissipation layer comprises Ru having a thickness of about 4 nm to about 5 nm, and the cooling layer comprises Cr having a thickness of about 1.5 nm to about 2.5 nm. The spintronic device further comprises a NiAl layer having a thickness of about 2 nm to about 4 nm disposed in contact with the spin torque layer, a Ru layer having a thickness of about 2 nm to about 2.5 nm disposed in contact with the NiAl layer, and a NiFeTa layer having a thickness of about 2.5 nm to about 3 nm disposed in contact with the Ru layer and the high etch rate layer. The spintronic device, the main pole, and the trailing shield are disposed at a media facing surface. The trailing shield comprises a notch, and the first spacer layer is disposed in contact with the notch. The spintronic device further comprises a field generation layer disposed between the trailing shield and the first spacer layer, and a second spacer layer or cap layer disposed between the field generation layer and the trailing shield. A magnetic recording device comprises the magnetic recording head.

In yet another embodiment, a magnetic recording head comprises a main pole, a trailing shield disposed adjacent to the main pole, and a spintronic device disposed between the main pole and the trailing shield, the spintronic device comprising: a spin torque layer, a Cu layer disposed under the spin torque layer, a Ru layer disposed in contact with the Cu layer, and a Cr layer disposed in contact with the Ru layer and the main pole.

The spintronic device further comprises a NiAl layer having a thickness of about 2 nm to about 4 nm disposed in contact with the spin torque layer, a Ru layer having a thickness of about 2 nm to about 2.5 nm disposed in contact with the NiAl layer, and a NiFeTa layer having a thickness of about 2.5 nm to about 3 nm disposed in contact with the Ru layer and the Cu layer. The Cu layer has a thickness of about 1 nm to about 3 nm, the Ru layer has a thickness of about 4 nm to about 5 nm, and the Cr layer has a thickness of about 1.5 nm to about 2.5 nm. The spintronic device further comprises a first spacer layer disposed in contact with the spin torque layer and the trailing shield. The spintronic device further comprises a first spacer layer disposed in contact with the spin torque layer, a field generation layer disposed between the trailing shield and the spacer layer, and a second spacer layer or cap layer disposed between the field generation layer and the trailing shield. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing shield disposed adjacent to the main pole; and
   a spintronic device disposed between the main pole and the trailing shield, the spintronic device comprising:
     a field generation layer disposed adjacent to the trailing shield;
     a spacer layer disposed in contact with the field generation layer;
     a spin torque layer disposed in contact with the spacer layer;
     a multilayer seed layer disposed in contact with the spin torque layer and the main pole, the multilayer seed layer comprising a heat dissipation layer and a cooling layer disposed in contact with the heat dissipation layer;
     an anti-damping layer disposed in contact with the spin torque layer;
     a texture layer disposed in contact with the anti-damping layer; and
     an amorphous layer disposed in contact with the texture layer and the heat dissipation layer.

2. The magnetic recording head of claim 1, wherein the heat dissipation layer comprises Ru and the cooling layer comprises Cr.

3. The magnetic recording head of claim 2, wherein the heat dissipation layer has a thickness of about 6 nm to about 12 nm, and the cooling layer has a thickness of about 1.5 nm to about 2.5 nm.

4. The magnetic recording head of claim 1, wherein the cooling layer is disposed in contact with the main pole.

5. The magnetic recording head of claim 1, wherein the anti-damping layer comprises NiAl, the texture layer comprises Ru, and the amorphous layer comprises NiFeTa.

6. The magnetic recording head of claim 1, wherein the anti-damping layer has a thickness of about 2 nm to about 4 nm, the texture layer has a thickness of about 2 nm to about 2.5 nm, and the amorphous layer has a thickness of about 2.5 nm to about 3 nm.

7. A magnetic recording device comprising the magnetic recording head of claim 1.

8. A magnetic recording head, comprising:
   a main pole;
   a trailing shield disposed adjacent to the main pole; and
   a spintronic device disposed between the main pole and the trailing shield, the spintronic device comprising:
     a first spacer layer disposed adjacent to the trailing shield;
     a spin torque layer disposed in contact with the first spacer layer;
     a multilayer seed layer disposed in contact with the spin torque layer and the main pole, the multilayer seed layer comprising a high etch rate layer, a heat dissipation layer disposed in contact with the high etch rate layer, and a cooling layer disposed in contact with the heat dissipation layer and the main pole;
     a NiAl layer disposed in contact with the spin torque layer;
     a Ru layer disposed in contact with the NiAl layer; and
     a NiFeTa layer disposed in contact with the Ru layer and the high etch rate layer.

9. The magnetic recording head of claim 8, wherein the high etch rate layer comprises Cu having a thickness of about 1 nm to about 3 nm, the heat dissipation layer comprises Ru having a thickness of about 4 nm to about 5 nm, and the cooling layer comprises Cr having a thickness of about 1.5 nm to about 2.5 nm.

10. The magnetic recording head of claim 8, wherein the NiAl layer has a thickness of about 2 nm to about 4 nm, the Ru layer has a thickness of about 2 nm to about 2.5 nm, and the NiFeTa layer has a thickness of about 2.5 nm to about 3 nm disposed in contact with the Ru layer and the high etch rate layer.

11. The magnetic recording head of claim 8, wherein the spintronic device, the main pole, and the trailing shield are disposed at a media facing surface.

12. The magnetic recording head of claim 8, wherein the trailing shield comprises a notch, and wherein the first spacer layer is disposed in contact with the notch.

13. The magnetic recording head of claim 8, wherein the spintronic device further comprises a field generation layer disposed between the trailing shield and the first spacer layer, and a second spacer layer or cap layer disposed between the field generation layer and the trailing shield.

14. A magnetic recording device comprising the magnetic recording head of claim 8.

15. A magnetic recording head, comprising:
   a main pole;
   a trailing shield disposed adjacent to the main pole; and
   a spintronic device disposed between the main pole and the trailing shield, the spintronic device comprising:
     a spin torque layer;
     a Cu layer disposed under the spin torque layer;
     a Ru layer disposed in contact with the Cu layer;
     a Cr layer disposed in contact with the Ru layer and the main pole;
     a NiAl layer disposed in contact with the spin torque layer;
     a Ru layer disposed in contact with the NiAl layer; and
     a NiFeTa layer disposed in contact with the Ru layer and the Cu layer.

16. The magnetic recording head of claim 15, wherein the NiAl layer has a thickness of about 2 nm to about 4 nm, the Ru layer has a thickness of about 2 nm to about 2.5 nm, and the NiFeTa layer has a thickness of about 2.5 nm to about 3 nm.

17. The magnetic recording head of claim 15, wherein the Cu layer has a thickness of about 1 nm to about 3 nm, the Ru layer has a thickness of about 4 nm to about 5 nm, and the Cr layer has a thickness of about 1.5 nm to about 2.5 nm.

18. The magnetic recording head of claim 15, wherein the spintronic device further comprises a first spacer layer disposed in contact with the spin torque layer and the trailing shield.

19. The magnetic recording head of claim 15, wherein the spintronic device further comprises a first spacer layer disposed in contact with the spin torque layer, a field generation layer disposed between the trailing shield and the spacer layer, and a second spacer layer or cap layer disposed between the field generation layer and the trailing shield.

20. A magnetic recording device comprising the magnetic recording head of claim 15.

\* \* \* \* \*